C. ROBINSON & H. PERSON.
SPRING SUSPENSION.
APPLICATION FILED OCT. 31, 1916.

1,217,111. Patented Feb. 20, 1917.

INVENTORS
Clark Robinson
Herman Person
BY
L. L. Westfall
ATTORNEY

UNITED STATES PATENT OFFICE.

CLARK ROBINSON AND HERMAN PERSON, OF HILLYARD, WASHINGTON, ASSIGNORS TO DUPLEX SHOCK-ABSORBER CO., OF SPOKANE, WASHINGTON, A CORPORATION.

SPRING SUSPENSION.

1,217,111.  Specification of Letters Patent.  Patented Feb. 20, 1917.

Application filed October 31, 1916. Serial No. 128,779.

*To all whom it may concern:*

Be it known that we, CLARK ROBINSON and HERMAN PERSON, citizens of the United States of America, residing at Hillyard, in the county of Spokane and State of Washington, have invented certain new and useful Improvements in Spring Suspension, of which the following is a specification.

This invention pertains to a device or form of spring suspension, sometimes known as a shock absorber, intended to give easy riding qualities to a vehicle.

A further object is to check the extreme movements of the springs, serving the objects of making the vehicle ride easier and of lessening the liability of the springs to break.

Figure 1:
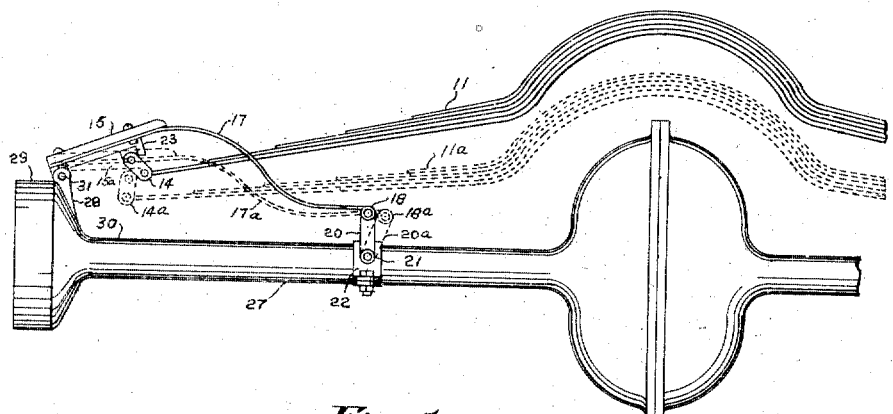
Figure 2:
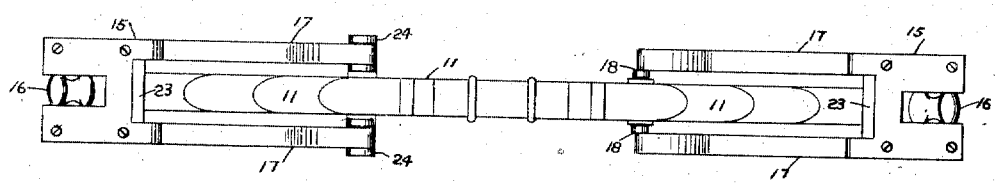
Figure 3:
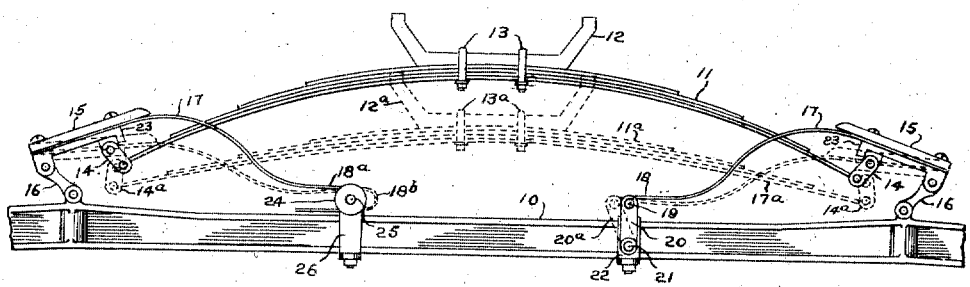
Figure 4:
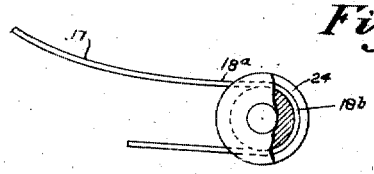

Other and further objects and purposes will be hereinafter disclosed and particularly described and illustrated in the accompanying drawings, in which Figure 1, is a partial rear view of an automobile showing a preferred form of spring suspension in elevation and part of the rear axle and automobile frame, Fig. 2, is a top plan view of the front axle of an automobile together with the spring thereon, said spring being suspended by two separate forms of spring suspension, one at each end of the spring, Fig. 3, is a side elevation of Fig. 2 showing the movable parts in two positions, one of them being shown in dotted lines, and Fig. 4, is an enlarged broken-away view of one of the spools and of one of the suspension springs, showing the manner of mounting of one end of the suspension springs.

In a detail description in which like numerals refer to like parts throughout the several views, 10 indicates the front axle of a vehicle, 11 a leaf or laminated plate spring and 12 the body portion of the vehicle. In the particular application shown in these figures the spring 11 is a cross-spring extending longitudinally of the vehicle axle and has its center portion rigidly fastened to the frame 12 by the clamps 13. The two outer ends of this spring are each fastened to one of my devices which are shown in the figures.

The ends of the spring 11 are formed into eyes which are pivoted to the lower ends of swinging shackles or links 14. The upper ends of these shackles or links 14 are pivoted to blocks 15. The blocks 15 are pivoted to supports 16 which in turn are rigidly attached to the axle 10. Rigidly secured to the blocks 15 are two parallel springs 17 having movable ends adjusted as hereinafter described. Having shown two ways of mounting these movable ends, the manner of mounting will be taken up and described separately.

Reference is now had to Fig. 3, to the springs 17 on the right side thereof. The ends 18 are formed into eyes and mounted upon pivots 19 extending horizontally outwardly from arms 20 pivoted as at 21 to a clamp 22 engaging the axle 10. Extending downwardly from the blocks 15 to positions in front of the links 14 are ledges 23. When by reason of the movements of the vehicle and the weight upon the same, the spring 11 is forced downwardly as to the position of the dotted lines 11ª, the springs 17 are thrown downwardly to the position of the dotted lines 17ª and the arms 20 are thrown to the position of the dotted lines 20ª. In the return to normal position of the said parts, the links 14 strike against the ledges 23 thereby preventing the upward rebound of the spring 11.

Referring now to the spring 17 at the left side of Fig. 3, the movable ends 18ª are formed into loops 18ᵇ, the loops engaging spools 24 rotatably and horizontally mounted on pivots 25 extending outwardly from clamps 26 rigidly secured to the axle 10. These two ways of mounting the springs 17 so as to have movable ends are shown as we do not wish to be limited to any particular way of mounting the movable ends, although we now prefer the mounting as first above described. In the mounting last above described when the spring 11 is pressed downwardly to the position of the dotted lines 11ª the loop 18ᵇ is forced inwardly toward the center of the vehicle away from the spool 24 and upon the return of the spring 11 returns to its normal position as shown in Fig. 4, the pressure of the end 18ª upon the spool 24 rotating the same.

In Fig. 1 we have shown the manner of pivoting the blocks 15 to the rear axle 27 which is by supports 28 extending upwardly through the brake drums 29, secured to the casing 30 and pivoted to the blocks 15 as at 31.

What is claimed is—

1. A vehicle spring suspension comprising a leaf spring, supports near the ends of the spring, blocks pivoted to the supports, a pair of springs each having one end rigidly secured to one of said blocks and extending inwardly toward the center of the leaf spring and having the other or inner ends pivotally secured to arms pivotally connected to the vehicle axle or axle casing and a suspended pivoted connection of said leaf spring to said block between said pair of springs.

2. A vehicle spring suspension comprising a leaf spring, supports near the ends of the spring, blocks pivoted to the supports, a pair of springs each having one end rigidly secured to one of said blocks and extending inwardly toward the center of the leaf spring and having the other or inner ends secured to a support that will permit of endwise movement of said springs, links pivotally suspended from said blocks to which the ends of the leaf spring are pivotally connected and ledges extending downwardly from the said blocks in front of and in close proximity to said links.

In testimony whereof we have affixed our signatures in presence of two witnesses.

CLARK ROBINSON.
HERMAN PERSON.

Witnesses:
J. E. McANDREW,
L. L. WESTFALL.